United States Patent Office 3,060,235
Patented Oct. 23, 1962

3,060,235
PHENYL ETHER-UREAS
Henry Martin, Basel, and Hans Aebi, Riehen, Switzerland, assignors to Ciba Limited, Basel, Switzerland, a company of Switzerland
No Drawing. Filed Aug. 1, 1960, Ser. No. 46,347
Claims priority, application Switzerland Aug. 5, 1959
7 Claims. (Cl. 260—553)

This invention provides new carbamic acid derivatives of the formula

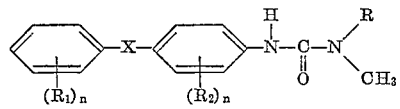

in which R represents a hydrogen atom or a lower alkyl radical, $R_1$ and $R_2$ each represent a hydrogen or halogen atom or an alkyl, halogen alkyl, trifluoromethyl or alkoxy radical or a nitro or nitrile group, X represents an oxygen or sulfur atom, and $n$ is the whole number 1, 2 or 3.

These compounds are suitable for influencing plant growth and combating weeds.

N-substituted ureas and thioureas have found a wide variety of commercial uses, depending on the nature and number of the N-substituents. Thus, it has been proposed to use substituted ureas as dyestuff intermediates, as dyestuffs, as textile assistants, for example, as optical bleaching agents and as detergents, and also as antioxidants and as lubricants. Especially varied, however, are the uses of N-substituted carbamic acid amides in the chemotherapeutic and pharmacological fields. Diaryl-ureas containing trifluoromethyl groups have been recommended as mothproofing agents, and α-naphthyl-thiourea has been proposed as a rodenticide. Various diaryl-thioureas have been prepared and investigated as tuberculostatic agents, and 4-n-butoxy-4'-dimethylamino-diphenyl-thiourea has been used for the treatment of leprosy.

In recent years N-phenyl-N'N'-dimethyl-ureas, especially nuclear halogen substitution products thereof, have received consideration as herbicidal substances (Science Vol. 114, pages 493 to 494 [1951]). According to the literature (Chemistry and Industry, 1957, page 1106) 1000 urea products have been tested for their herbicidal action, and among them N-4-chlorophenyl-N':N'-dimethyl-urea, N-3-chlorophenyl-N':N'-dimethyl-urea, 3:4-dichlorophenyl-N':N'-dimethyl-urea and 3:4:5-trichlorophenyl-N':N'-dimethyl-urea stand out as having especially good activities as compared with phenyl-urethane. Measurements according to the Hill reaction show that these four compounds have relative inhibiting values of the order of 125:250:2500:2500 (phenyl - urethane=1) whereas the closely related N-4-methoxyphenyl-N':N'-dimethyl-urea possesses by way of comparison an inhibiting value of only 1:10.

The present invention is based on the unexpected observation that the N-4-phenoxy-phenyl-N'-methyl-ureas and substitution products thereof containing halogen atoms or alkyl, trifluoromethyl, alkoxy, nitro or nitrile groups and their immediate derivatives, which correspond to the general formula given above, possess excellent herbicidal properties. This observation is all the more remarkable as the N-phenoxyphenyl-N'-aryl-ureas or -thioureas described in United States Patents No. 2,311,062 patented February 16, 1943, by Henry Martin et al., No. 2,715,643 patented August 16, 1955, by Henry Martin and No. 2,649,476 patented August 18, 1953, by Henry Martin possess no herbicidal action.

The compounds of the aforesaid formula can be made by the application of known general methods, and generally speaking any customary method for making urea derivatives can be used. Various methods are referred to below without a complete enumeration of all the methods:

(The diphenyl ether radical in the formulae below is given the symbol Ar)

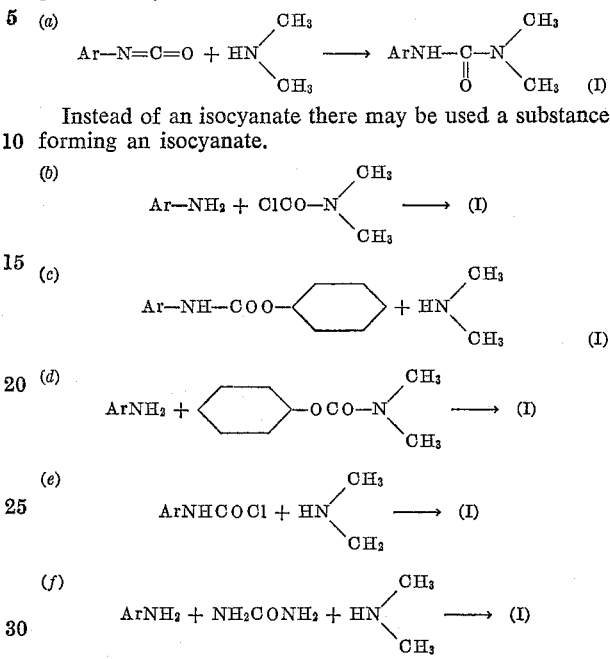

Among the numerous compounds of the invention, the following may be mentioned as examples:

N-4-(phenoxy)-phenyl-N':N'-dimethyl-urea,
N-4-(para-chlorophenoxy)-phenyl-N':N'-dimethyl-urea,
N-4-(para-chlorophenoxy)-phenyl-N'-monomethyl-urea,
N-4-(phenoxy)-phenyl-N'-monomethyl-urea,
N-4-(para-cresoxy)-phenyl-N':N'-dimethyl-urea,
N-4-(ortho-chlorophenoxy)-phenyl-N':N'-dimethyl-urea,
N'-4-(ortho-cresoxy)-phenyl-N':N'-dimethyl-urea,
N-4-(meta-cresoxy)-phenyl-N':N'-dimethyl-urea,
N-4-(phenoxy)-phenyl-N'-methyl-N'-butyl-urea,
N-4-(meta-xylenoxy)-phenyl-N':N'-dimethyl-urea,
N - 4 - (ortho:para - dichlorophenoxy)-phenyl-N':N'-dimethyl-urea,
N-4-(phenoxy-)-3-chlorophenyl-N':N'-dimethyl-urea,
N-4-(para - cresoxy) - 3 - chlorophenyl-N':N'-dimethyl-urea,
N-4-(phenylthio)-phenyl-N':N'-dimethyl-urea,
N-4-(phenoxy) - 3 - trifluoromethylphenyl-N':N'-dimethyl-urea,
N-4-(para-cresoxy) - 3 - trifluoromethylphenyl-N':N'-dimethyl-urea,
N - 4 - (para-chloro-meta-cresoxy)-phenyl-N':N'-dimethyl-urea,
N - 4 - (para-methoxyphenoxy)-phenyl-N':N'-dimethyl-urea.

The compounds of the invention can be used by making them up into preparations suitable for the purpose for which they are to be used. The active substance may be present in the preparation in emulsified or dispersed form, or in a dusting preparation in which it may be present alone or together with another weed killing agent, for example, tri- or tetra- substituted aryl-alkylureas, halogenated phenoxyalkane carboxylic acids, halogenated benzoic acids, halogenated phenyl-acetic acids, halogenated fatty acids, or salts, esters or amides of these acids, or together with borax or other inorganic salt, such as abraum salts, or with calcium cyanamide, urea or other fertilizer, or together with pest combating agents, for example, chlorinated hydrocarbons or phosphoric acid esters. On the other hand, active substances of basic reaction, such as tertiary or quaternary amines, that possess a herbicidal action may also be incorporated in the preparations, for example, dodecyl-hexamethylene imine or a salt thereof, or 1:1'-ethylene-2:2'-dipyridinium dibromide. There may also be added carbamates or thiol-carbamates or dithiocarbamic acid esters or derivatives of symmetrical triazine having a herbicidal action. There may also be used herbicidal heterocyclic compounds, for example, 2 - chlorobenzthiazole, 3-amino-1:2:4-triazole, maleic acid hydrazide, 3:5-dimethyl-tetrahydro-1:3:5:2:4-thiadiazine-2-thione, or simpler herbicidal substances, such as pentachlorophenol, dinitrocresol, dinitro-butyl-phenol, naphthyl-phthalamic acid or methyl isothiocyanate.

For making solutions ready for spraying there may be used, for example, mineral oil fractions of high to medium boiling range such as diesel oil or kerosene, or coal tar oils or animal oils, and also hydrocarbons such as alkylated naphthalenes, tetrahydronaphthalene, if desired, with the use of mixtures of xylenes, cyclohexanols, ketones and also chlorinated hydrocarbons, such as tetrachlorethane, trichlorethylene or tri- or tetra-chlorobenzenes.

Aqueous preparations suitable for application can be prepared by the addition of water to emulsion concentrates, pastes or wettable powders. As emulsifying or dispersing agents there may be used non-ionic products, for example, condensation products of ethyleneoxide with aliphatic alcohols, amines or carboxylic acids containing a hydrocarbon radical having about 10 to 30 carbon atoms, such as a condensation product of octadecyl alcohol with 25 to 30 molecular proportions of ethylene oxide, or of soya bean fatty acid with 30 molecular proportions of ethylene oxide or of commercial oleylamine with 15 molecular proportions of ethylene oxide or of dodecyl-mercaptan with 12 molecular proportions of ethyleneoxide. Among anion active emulsifying agents there may be mentioned the sodium salt of dedecyl alcohol sulfuric acid ester, the sodium salt of dodecyl-benzene sulfonic acid ester, the potassium or triethanolamine salt of oleic acid or abietic acid, or of a mixture of these acids, or the sodium salt of petroleum-sulfonic acid. As cation-active dispersing agents there may be used quaternary ammonium compounds, such as cetyl-pyridinium bromide or di-(hydroxyethyl)-benzyl-dodecyl-ammonium chloride.

For making dusting or scattering preparations there may be used as solid carriers talcum, kaolin, bentonite, calcium carbonate or calcium phosphate, or carbon, cork meal or wood meal or other materials of vegetable origin. The various preparations can be rendered more suitable for the various ways in which they are to be used by the known addition of substances which improve the dispersion adhesiveness, resistance to rain or penetration capacity of the compositions. As such substances there may be mentioned fatty acids, resins, glue, casein or, for example, alginates or the like. It is of considerable advantage to make up the preparations in granular form.

The herbicidal preparations of this invention are suitable, depending on the substitution of the urea derivatives, for the selective destruction of weeds under crop plants and also for the total killing and destruction of undesired plant growth. The term "weeds" is used in this connection to include undesired plants, that is to say plants previously planted or those growing in the vicinity.

The following examples illustrate the invention, the parts and percentages being by weight:

*Example 1*

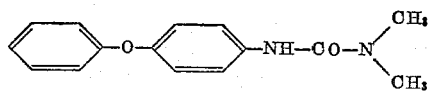

211 grams of 4-phenoxyphenyl isocyanate (boiling point at 11 mm.: 163–166° C.) are dissolved in 200 cc. of acetonitrile and stirred slowly into 220 cc. of dimethyl-amine of 40% strength in 1500 cc. of water, the stirring being carried out vigorously. N-4-phenoxyphenyl-N':N'-dimethylurea is rapidly precipitated. Stirring is continued for some hours, filtering with suction and washing with large quantities of water and a little dilute acetic acid are then carried out and the condensation product is dried in vacuo at 60° C. The crude yield is 250 grams. The melting point of the crude product is 149–150° C. Recrystallized from alcohol, the melting point is 150–151° C.

$C_{15}H_{16}O_2N_2$, calculated: N, 10.93%. Found: N, 10.74%.

*Example 2*

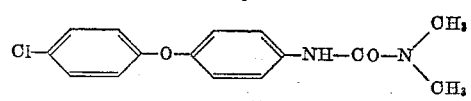

290 grams of 4-p-chlorophenoxyphenyl isocyanate (boiling point at 0.2 mm.: 136–138° C.) are dissolved in 290 cc. of acetone and stirred vigorously into 220 cc. of dimethylamine of 40% strength in 1500 cc. of water, N-4-(p-chlorophenoxy)-phenyl-N':N'-dimethyl urea being precipitated. After some hours, this is collected, washed with water and dried in vacuo at 65° C. The yield of crude product is 332 grams. The melting point is 143 to 147° C. Recrystallized from alcohol, the product melts at 151–152° C.

$C_{15}H_{15}O_2N_2Cl$, calculated: N, 9.64%; Cl, 12.20%. Found: N, 9.56%; Cl, 12.22%.

*Example 3*

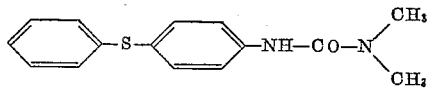

310 grams of 4-phenylthiophenyl isocyanate (boiling point at 0.06 mm.: 132–136° C.) are dissolved in 300 cc. of acetone and dropped while stirring vigorously into 195 cc. of aqueous dimethylamine solution of 40% strength in 1500 cc. of water. N-4-(thiophenyl)-phenyl-N':N'-dimethyl urea is immediately precipitated. This is filtered off, washed well with water and a little dilute acetic acid and dried in vacuo at 60 C. The crude yield is 366 grams. The melting point is 120–121° C. Recrystallized from alcohol, the melting point of the pure product is 122–123° C.

$C_{15}H_{16}ON_2S$, calculated: N, 10.29%; S, 11.77%. Found: N, 10.05%; S, 11.48%.

*Example 4*

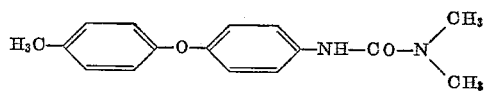

450 grams of 4-(p-cresoxy)-phenyl isocyanate (boiling point at 0.03 mm.: 117 to 118° C.) are dissolved in 450 cc. of acetonitrile and added while stirring vigorously to 270 grams of aqueous dimethylamine solution of 40% strength in 2500 cc. of water. The N-4-(p-cresoxy)-phenyl-N':N'-dimethyl urea is worked up as described in Example 1. The crude yield is 530 grams. The melting point is 161.5 to 164° C. Recrystallized from alcohol, the melting point of the pure product is 166–167° C.

$C_{16}H_{18}O_2N_2$, calculated: C, 71.09%; H, 6.71%; N, 10.36%. Found: C, 71.22%; H, 6.99%; N, 10.60%.

*Example 5*

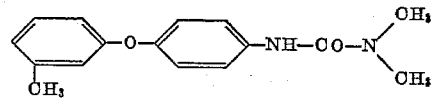

The N-4-(m-cresoxyl)-phenyl-N':N'-dimethyl urea is prepared in the same manner as described in Example 4. It melts at 135 to 136° C.

$C_{16}H_{18}O_2N_2$, calculated: C, 71.09%; H, 6.71%; N, 10.36%. Found: C, 71.00%; H, 6.82%; N, 10.41%.

Example 6

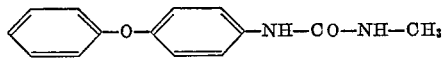

25 grams of 4-phenoxyphenyl isocyanate are treated as described in Example 1 with an aqueous solution of monoethylamine. The N-4-(phenoxy)-phenyl-N'-methyl urea, recrystallized from alcohol, melts at 166 to 167° C.

$C_{14}H_{14}O_2N_2$, calculated: C, 69.40%; H, 5.83%; N, 11.56%. Found C, 69.35%; H, 5.86%; N, 11.63%

Example 7

20 parts of N-4-(phenoxy)-phenyl-N':N'-dimethyl urea and 80 parts of talc are ground very finely in a ball mill. The mixture obtained serves as a dusting agent.

Example 8

20 parts of N-4-(phenoxy)-phenyl-N':N'-dimethyl urea or N-4-(p-chlorophenoxy)-phenyl-N':N'-dimethyl urea are dissolved in a mixture of 48 parts of diacetone alcohol, 16 parts of xylene and 16 parts of a condensation product of ethylene oxide with higher fatty acids, for example the condensation product obtained from soybean fatty acid and 30 mols of ethylene oxide. This concentrate can be diluted with water to give emulsions of any desired concentration.

Example 9

80 parts of N-4-(phenoxy)-phenyl-N':N'-dimethyl urea or equal parts of N-4-(p-cresoxy)-phenyl-N':N'-dimethyl urea are mixed with 4 parts of a wetting agent, for example the sodium salt of butylnaphthalene sulfonic acid, 1 to 3 parts of a protective colloid, for example waste sulfite liquor, and 15 parts of a solid inert carrier, such as kaolin, chalk or kieselguhr, and thereupon finely ground. The wettable powder obtained may be mixed with water before use and gives a suspension which is ready for use.

Example 10

10 parts of 4-phenoxy-phenyl-N':N'-dimethyl-urea are dissolved in 90 parts of coal-tar oil, diesel oil or spindle oil.

Example 11

To 10 grams of the Compounds a, b, c, d, e and f there are added separately in each case 2 grams of waste sulfite pulp liquor and 100 cc. of water and the mixture is thereafter subjected to intensive grinding, whereby finely divided, stable dispersions are obtained. The Compounds a to f correspond to the following formulae:

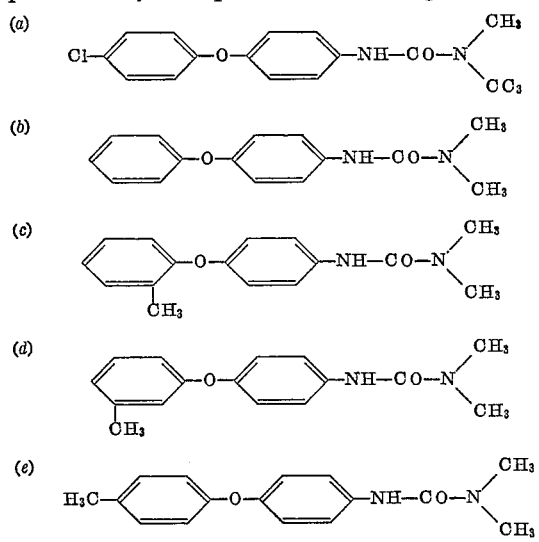

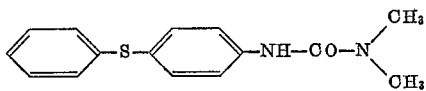

Example 12

80 parts of Compounds a, b, e and f are mixed with 16 parts of kaolin and 4 parts of an emulsifier supplied by Ninol Inc., Chicago, under the trademark "Toximul MP" and finely ground. The mixtures can be used as wettable powders.

Example 13

Flowerpots are filled with earth in a greenhouse and sown with seeds of the following plants: *Avena sativa, Sorghum sudanense, Dactylis glomerata, Sinapis alba, Lepidium sativum, Calendula chrysantha*. The earth is watered and its surface is treated on the day of sowing with dispersions of the compounds formulated according to Example 11. The quantity employed corresponds to 10 kg. of active substance per hectare. 4 weeks after treatment, the test plants treated with Compounds a, b, c, d and f have died off completely or almost completely. In the case of Compound e, the test period was not sufficient for complete destruction of *Dactylis glomerata*.

Example 14

Flowerpots are filled with earth in a greenhouse and sown with seeds of the following plants: *Sorghum sudanense, Dactylis glomerata, Sinapis alba, Lepidium sativum* and *Calendula chrysantha*. 10 to 14 days after showing, the plants are treated with spraying liquids obtained from the dispersions prepared according to Example 11. The quantity employed corresponds in each case to 10 kg. of active substance per hectare. 2 to 3 weeks after treatment, all the test plants have died off completely or almost completely.

Example 15

A field is freed before the commencement of the test from all annual weeds and sown with the following test plants:

*Aveny sativa, Setaria italica, Allium cepa, Brassica rapa, Sinapis alba, Raphanus raphanistrum, Linum usitatissimum, Soja max, Trifolium pratense, Trifolium repens, Beta vulgaris, Phaseolus vulgaris, Spinacia oleracea* and *Lactuca sativa*. On the day of sowing, the field is treated with dispersions, prepared from the wettable powders produced according to Example 12, of Compounds a, b and f. The quantity employed is 5 kg. of active substance per hectare. 30 days after treatment, all the test plants have died off completely or almost completely. The weeds which have come up between the rows are also destroyed or heavily damaged. Similar results are obtained when the treatment of the field is not carried out until 4 weeks after the sowing of the test plants.

What is claimed is:

1. A compound of the formula

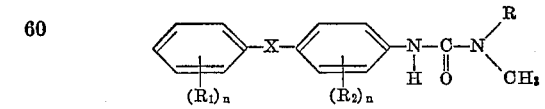

wherein R is lower alkyl, each of $R_1$ and $R_2$ is a member selected from the group consisting of hydrogen, halogen, lower alkyl, trifluoromethyl, lower alkoxy and nitro, X is a member selected from the group consisting of O and S, and n is a whole number of at the most 3.

2. N-4-(phenoxy)-phenyl-N':N'-dimethyl-urea.

3. N-4-(para-chlorophenoxy)-phenyl-N':N'-dimethyl-urea.

4. N-4-(para-cresoxy)-phenyl-N':N'-dimethyl-urea.

5. N-4-(meta-cresoxy)-phenyl-N':N'-dimethyl-urea.

6. N-4-(ortho-cresoxy)-phenyl-N':N'-dimethyl-urea.

7. N-4-(phenylthio)-phenyl-N':N'-dimethyl-urea.

References Cited in the file of this patent

UNITED STATES PATENTS

| | | |
|---|---|---|
| 2,311,784 | Spaeth | Feb. 23, 1943 |
| 2,709,648 | Ryker et al. | May 31, 1955 |
| 2,723,192 | Todd | Nov. 8, 1955 |
| 2,876,088 | Hill et al. | Mar. 3, 1959 |
| 2,957,910 | Patterson | Oct. 25, 1960 |

OTHER REFERENCES

Von Meyer: J. Prakt. Chem., volume 176 (1903), page 269.

Lange et al.: J. Amer. Chem. Soc., volume 48 (1926), pages 1069–74.

Roberts et al.: Science Bulletin, Univ. of Kansas, volume 25, No. 11 (June 1, 1938), pages 213–227—pages 215–6 particularly relied on.

Lowry et al.: Organic Chemistry (Seventh Edition, 1951) page 215.